R. J. HAGEY.
SYSTEM FOR GAGING CYLINDRICAL MEASURES.
APPLICATION FILED SEPT. 24, 1912.
1,085,905.
Patented Feb. 3, 1914.
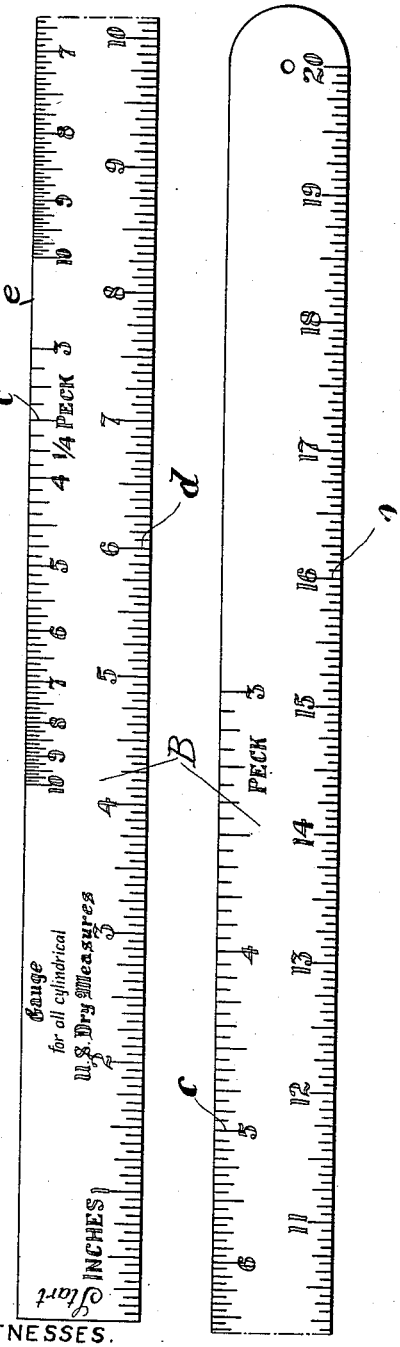
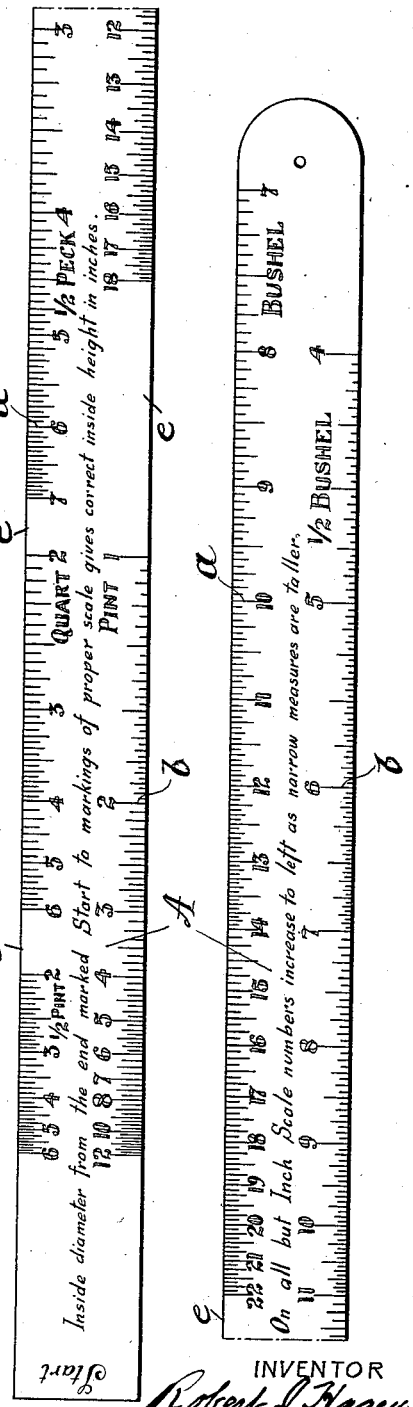

UNITED STATES PATENT OFFICE.

ROBERT J. HAGEY, OF PHILADELPHIA, PENNSYLVANIA, ASSIGNOR TO CHARLES E. TROEMNER, OF PHILADELPHIA, PENNSYLVANIA.

SYSTEM FOR GAGING CYLINDRICAL MEASURES.

1,085,905. Specification of Letters Patent. Patented Feb. 3, 1914.

Application filed September 24, 1912. Serial No. 722,059.

*To all whom it may concern:*

Be it known that I, ROBERT J. HAGEY, a citizen of the United States, residing at Philadelphia, in the county of Philadelphia and State of Pennsylvania, have invented certain new and useful Improvements in Systems for Gaging Cylindrical Measures, of which the following is a specification.

My invention relates to an improved system for rapidly testing and readily determining generally the correct dimensions of cylindrical measures by the employment of a device with predetermined graduations, and which device may be used either in a foldable or unfoldable form, and also provided with calibrations for cylindrical U. S. dry measures and for other measures of volume.

My invention further relates to a device for rapidly ascertaining correct dimensions for cylindrical measures, when one of the dimensions is given.

According to the above defined invention, all that is necessary is to place the edge of the device where marked with the proper scale along the diameter of the measure and read at once in inches the correct depth of a cylindrical measure for the diameter thus before the operative. For example, a certain bushel measure is just 17.7529 inches in diameter. By placing the edge of the device where it is marked "Bushel" across the measure at its diameter, will be indicated $8\frac{11}{16}$ inches, which is the correct inside depth for a cylindrical bushel measure of the above given diameter, that is, at a distance from the end of the device marked "Start" equal to the diameter of any certain measure will be found in a scale marked according to the capacity intended, instead of its diameter readings, the graduations of a scale showing at once its correct inside depth. In the above example, at a distance of just 17.7529 inches from the end marked "Start," on the scale marked "Bushel," the graduation will be $8\frac{11}{16}$ inches, thus as the bushel measure here employed for illustration is of the above given diameter, the placing of the scale across the measure at its diameter, will indicate $8\frac{11}{16}$ inches on the scale marked "Bushel," it not being necessary to ascertain what that diameter is, in inches, for at this point instead of diameter readings, will be found scale graduations giving at once the correct inside depth for an accurate bushel of a diameter of such a length; this being equally true as to the other scales. Now one edge of the device is provided with an ordinary scale of inches, and by measuring the depth of the measure thereby, any false bottom or gross inaccuracy is at once apparent. Whereas the most careful test of the contents of cylindrical or approximately cylindrical measures at present, requires the use of some liquid, so as to include the measurement of even very small indentations or irregularities, and also a very careful calculation of the expansion both of the liquid used and of the walls of the measure. To satisfactorily make such a test requires sensitive balances, accurate standard weights, corrected barometer, thermometer and hygrometer, together with the knowledge of the purity and expansion co-efficient of the liquid used, and necessarily with a large chart of figures to make allowances for ever varying conditions. The bulk weight and fine adjustments of such an outfit preclude portability. Portable outfits equipped to give fair approximations by the above method can only include tests for smaller measures, or be so bulky as to advertise the approach of the inspector and hence many times defeat the purpose where it is not intended to give a thorough laboratory standardizing test, but to "keep tab" on merchants and venders and without waste of time to trip up intentional or unintentional crookedness.

According to my above simplified device, accuracy in the graduations are more nearly attained, inasmuch as their position is determined by a formula eliminating the calculation of circular area.

The U. S. standard bushel is specified as a cylindrical vessel $18\frac{1}{2}$ inches in diameter and 8 inches deep, and contains 2150.42 cubic inches. The formula for calculating the volume of a cylinder is:—

$$\text{Volume } D^2 \times h \times .7854,$$

where "D" represents diameter, "$h$" represents height, and the decimal ".7854" or $\dfrac{\Pi}{4}$ is the approximate ratio of the area of a square to its inscribed circle; this in the case of the standard bushel would give:—

$18\frac{1}{2}^2 \times 8 \times .7854 = 2150.42$ cu. inches (nearly).

Now the Government specifies $18\frac{1}{2}$ inches diameter and 8 inches deep as standard, allowing vessels of other proportions, but of equal content. $18\tfrac{1}{2}^2 \times 8 = 2738$, an integral number, and any cylindrical measure, where the square of the diameter of its base multiplied by its height $= 2738$, will contain the same as the standard bushel. Thus the formula for the diameter of a bushel where the height is given becomes $$D = \sqrt{\frac{2738}{h.}}$$

eliminating the use of figures of approximation.

The chance for error and the error itself, probable in reading a scale, is minimized, inasmuch as the reading is done of divisions which represent completed calculations, instead of reading a line measurement (probably erroneously), and then multiplying that error. Also the error which is probable in the transference from one scale to another, or to a set of tables is eliminated, inasmuch as the result sought is read directly and instantly. Again the height indications being placed at distances representing diameter lengths from end of gage-device, afford larger scale divisions for the same difference in proportions, than if the diameter scale read in inches were arranged to be read against the height of the measure. The proper diameter true to the $\tfrac{1}{10000}$ of an inch for each $\tfrac{1}{16}$ or $\tfrac{1}{32}$ inch difference in height form scales of varying distances between the graduations, yet true to the fourth decimal place, conducing to accuracy in readings, because if read in inches, all the divisions would necessarily be small for the same degree of accuracy, and even then the transference from one scale to another would introduce two chances for error, and take more time.

In the accompanying drawings is illustrated a dry measure gage device in which—

Figures 1 and 2, are respectively, plan views of both sides of the same, showing the different special scales in their particular arrangement.

It is to be understood that the two parts of each figure of the said drawings are continuations of each other, and in such connected relation is the device so employed Referring to the drawings A, in Fig. 1, represents the special calibrated scale device on one side, of my invention, in which the calibrations on that side in their particular arrangement are designated by the letters $a$ and $b$, while B, represents the opposite side of the device in which the calibrations of that side are designated by the letters $c$ and $d$; the latter being an ordinary inch scale, while the former is a scale of special graduations, according to my arrangement.

It will be observed from the drawings that each graduation of the various scales is placed at a distance from the end of the device marked "Start" equal to the diameter of a measure, the height of which is indicated by said graduation.

As an instance of the use of the device above described, it can be employed as follows:—It is desired to test a certain pint measure, the diameter of which measured along the "pint" scale $b$, in Fig. 1, comes to a graduation numbered on said scale at $3\tfrac{1}{2}$. This graduation which is at the diameter of the measure tested, reads the correct inside depth sought, that is, the pint measure tested should be $3\tfrac{1}{2}$ inches inside depth. Whether or not the said measure is of such height can be tested by the ordinary inch scale $d$, on the reverse side of the device as illustrated in Fig. 2, and if other measures are to be tested by following the foregoing plan explained, using their appropriate scales, such tests of measures can in like manner be readily and accurately ascertained. Had the measure in question been a half-pint instead of a pint, yet its diameter the same, (a diameter hardly probable for a measure of this capacity, yet used here to illustrate a point) this would have fallen at a point, Fig. 1, beyond the extremity of the half-pint scale thereof, in a space $e$, left to avoid confusion of the scales, but on the pint scale this same diameter is taken care of by the graduation $3\tfrac{1}{2}$, and as a cylindrical half-pint of the same diameter, as a cylindrical pint will be just half as deep, one-half of the pint height indicated in the present instance, one-half of three and one-half, equals the inside depth for the half-pint measure under test. These spaces $e$, on both sides of the device in Figs. 1 and 2, which are left blank between the scales $a$, $b$ and $c$, to avoid confusion are at points representing diameters hardly probable in dry measures, but should such measures be of a diameter falling in these spaces $e$, the scales are so arranged as that one bridges the gap between two others of the said device, and from the graduations of that scale the correct depth can thereby be easily ascertained. The said arrangement of the scales makes possible the gaging of all measures, limited only by the length of the said device and at the same time avoiding confusion.

A second feature of my said invention is the provision of the gage device with calibrations which start from the same end, thus avoiding confusion in the use of the device and also making it easy to transfer from one scale to another. This ready transference from one scale to another makes it easy to read either depth or diameter in inches, and thus to arrive at inch calculations more rapidly and more accurately than by consulting a set of tables, and with less trouble than searching a complete set or making interpolations in a less complete set.

It will be clearly understood from the foregoing description of my said invention and explanatory illustrations of certain of the applications thereof, that such is not confined to gaging of dry measures, but generally the gaging of all measures of volume or content; and hence

Having thus described the nature and objects of my invention, what I claim as new and desire to secure by Letters Patent is:—

A gage-device, comprising in addition to a scale, for line measurements, a scale, for ascertaining the dimensions or content of a vessel, the cardinal graduation marks of which latter scale are provided with numbers, designating the depth of a vessel having a predetermined capacity and a diameter corresponding to the distance between the starting point of the scale and graduation, substantially as and for the purposes described.

In witness whereof, I have hereunto set my signature in the presence of the two subscribing witnesses hereto.

ROBERT J. HAGEY.

Witnesses:
THOMAS M. SMITH,
HELEN F. MILLER.

Copies of this patent may be obtained for five cents each, by addressing the "Commissioner of Patents, Washington, D. C."